3,547,844
SOLID PHENOLIC RESIN-BLOOD GLUE BASE
Dale J. Hohbach, Hillsboro, and Harold A. Smith, Forest Grove, Oreg., assignors to Pacific Adhesives Company, Inc., a corporation of Oregon
No Drawing. Filed Aug. 13, 1968, Ser. No. 752,127
Int. Cl. C08g *37/18;* C08h *7/00*
U.S. Cl. 260—7                                    8 Claims

ABSTRACT OF THE DISCLOSURE

A solid resin-blood glue base of improved storage and viscosity characteristics is prepared by forming a mixture of an aqueous phenolic resin with declotted, uncoagulated liquid blood and drying the resulting mixture.

---

This invention relates to glues comprising a dried mixture of aqueous phenolic resin and uncoagulated liquid blood.

Resin-blood glues for use by the plywood and other industries conventionally are made by collecting animal blood from the slaughterhouse floor, declotting the blood and spray drying it to form a solid blood glue base. The glue base is transported to the glue manufacturing plant where it is formulated into the finished glue by mixing it with predetermined portions of water, aqueous phenolic resin and such glue base dispersing chemicals as sodium silicate, caustic soda, lime, and anti-foaming agents. Soya meal, other proteins and fillers also may be included in the formulation.

This procedure has the disadvantage that the aqueous phenolic resin, which is a key component, can not be stored in the plant for long periods of time preliminary to its formulation into the finished glue. Accordingly the glue maker is under the necessity of continually purchasing relatively small quantities of the resin in order to have a fresh supply always on hand. Furthermore, the storage, handling and mixing in of the phenolic resin component adds a complicating step to the glue making procedure.

It now has been found that the foregoing problem may be overcome by combining the aqueous phenolic resin with the declotted uncoagulated liquid blood at the blood processing plant preliminary to the drying step. The resulting mixture then may be dried to form a storage-stable, solid, resin-blood product which may be stored for long periods of time without significant impairment of its glue-making properties.

As a result, the glue maker can maintain a large working stock of the mixture for use in accordance with the demands of his mill. Also, he may use it in the formulation of glues of improved viscosity and/or water extension characteristics, and improved resistance to deterioration by atmospheric and microbiological agents.

The uncoagulated animal blood which is one of the principal components of the herein described resin-blood glue base comprises animal blood collected and processed promptly after it has been obtained, or in any event before natural degradation processes have proceeded to a substantial degree. The blood is declotted to facilitate its subsequent processing.

The aqueous phenolic resin broadly comprises a resinous condensation product of a phenol and an aldehyde. The aldehydes which may be employed in the formulation of the resins comprise formaldehyde, acetaldehyde and furfural.

Phenols which may be employed comprise phenol itself, as well as cresol, xylenol and resorcinol.

The aldehyde and the phenol are condensed in known manner in the presence of alkali to form an aqueous alkaline resin having an aldehyde to phenol ratio of from 0.5:1 to 6:1, preferably 1:1 to 3:1, a solids content of from 20 to 60% by weight, and a pH of from 7.1 to 14.

In the formulation of the glue base the declotted uncoagulated liquid blood and the aqueous phenolic resin are added one to the other in the proportion of from 0.1 to 120% by weight, preferably from 1 to 25% by weight, of resin (dry solids basis) to blood (dry solids basis).

The resulting mixture is thoroughly agitated at ambient temperatures (32 to 120° F.) and pressures until the constituents are intermixed thoroughly. It then is ready for the application of a drying operation designed to remove the major proportion of its water content.

Water removal may be accomplished by any of the usual techniques which do not affect the blood adversely. Thus it may be dried on a heated vacuum drum or in a vacuum oven. Preferably, however it is spray dried by atomizing it and mixing it with hot air at a temperature which is sufficient to dry the blood rapidly, while still leaving it dispersible in alkaline glue-making mixtures.

This may be accomplished by mixing it with air at a temperature of from 300–500° F. at the time of introducing the liquid blood into the drier, and retaining it in the drier for a time period of from 2–20 seconds.

The dried resin-blood product then may be sacked and stored under usual atmospheric conditions for long periods of time without danger of loss of its glue making properties.

When it is to be used, the solid resin-blood mixture may be formulated into alkaline blood glue by mixing it with predetermined proportions of the usual glue-making chemicals in the usual manner.

Such chemicals may include protein-dispersing agents such as sodium silicate, caustic soda, and lime; anti-foaming agents such as pine oil; fillers such as wood flour, bark powder and walnut shell flour; and proteins other than blood such as soya flour, cotton seed meal, peanut meal, fish meal and casein, all used in proportions calculated to produce a glue of desired properties.

Surprisingly, particularly in view of the fact that liquid phenolic resins are notoriously subject to change with aging, the dried mixture of phenolic resin and declotted liquid blood is not subject to such change during storage under usual conditions. It may be stored for periods of a year or more without alteration of its glue making properties, as evidenced by its viscosity-imparting properties, its water extension properties, and its resistance to microbiological degradation.

Another unpredictable value deriving from the use of the dried resin-liquid blood combination is the very high viscosity which characterizes a glue in which it is contained. The viscosity is much higher than that obtained when the same amount of resin in liquid form is added separately to the blood.

The manner of formulation of the herein described resin-blood glue base and its application to the manufacture of industrial glues is illustrated in the following examples:

EXAMPLE 1

Declotted, uncoagulated animal blood fresh from the slaughterhouse and having a temperature of about 95° F. was mixed with a liquid phenol-formaldehyde resin having a solids content of 50% and a pH of about 13 in the proportions indicated below. The mixture was spray dried by atomizing it in hot air in a spray drier, where it was held at 300–500° F. for a time period of from 2–20 seconds.

The dried blood was formulated into four different glues containing, respectively, 7½%, 12½%, 25% and 100% by weight resin solids, based on the weight of the blood solids.

In each case 88 grams of the dried resin-blood mixture, 15 grams wood flour, 27 grams lime slurry containing 9 grams of hydrated lime, 26.3 grams of 36.3% by weight caustic soda solution, 47 grams sodium silicate, and 738 ml. water were blended thoroughly together and the Brookfield viscosities of the resulting blends determined.

As a control a composition containing no resin whatsoever was formulated and tested in the same manner. As a further control, the tests were repeated with mixtures equivalent to the foregoing, but using the spray dried and aqueous phenolic resin as separate components, rather than combined as a single spray dried product. The results are given below:

TABLE I

| 50% solids phenolic resin percent resin solids to blood solids | Viscosity (poises) | | | | |
|---|---|---|---|---|---|
| | Test samples | | | Control samples | |
| | 5 sec. | 30 sec. | 60 sec. | 5 sec. | 60 sec. |
| 0 | 18 | 28 | 43 | 34 | 50 |
| 7½ | 123 | 211 | 300 | 7 | 6 |
| 12½ | 246 | 334 | 398 | 7 | 6 |
| 25 | 299 | 400 | 458 | 7 | 6 |
| 100 | 390 | +500 | | 7 | 6 |

An inspection of the foregoing comparative results clearly reveals the improved viscosity characteristics imparted by the spray dried aqueous phenolic resin-liquid blood mixture over those produced when the aqueous phenolic resin and spray dried blood were employed as separate components.

The foregoing procedure was repeated using an aqueous phenolic resin containing but 40% solids phenolic resin in the proportions of 0, 3, 5 and 7% by weight of resin (solids basis) based on the weight of the blood (dry solids basis), with the same desirable improvement in viscosity:

TABLE II

| 40% solids phenolic resin percent resin solids to blood solids | Viscosity (poises) | | |
|---|---|---|---|
| | 5 sec. | 30 sec. | 60 sec. |
| 0 | 37 | 33 | 45 |
| 3 | 60 | 63 | 81 |
| 5 | 79 | 83 | 104 |
| 7 | 120 | 167 | 216 |

EXAMPLE 2

This example illustrates the resistance to aging and deterioration of the presently described phenolic resin blood glue base.

Animal blood was obtained fresh from the slaughterhouse, declotted and cleaned of all debris (hair, nails, meat, etc.). Its temperature was about 95° F. Phenolic resin at 50% solids was added to the blood with thorough mixing and the mixture at 80–90° F. was ready for drying.

The resin-reacted blood was spray dried by atomizing it in hot air at a temperature of from 300 to 500° F. and spraying it into a drier where it was held in the air stream at the indicated temperature for a time period of 2–20 seconds. The spray dried product was sacked and stored.

Glues then were made from the stored blood, again following the procedure of Example 1. Measurement of the Brookfield glue viscosities is given in the following table:

TABLE III

| 50% solids phenolic resin percent resin solids to blood solids | Age (days) | Viscosity (poises) | | |
|---|---|---|---|---|
| | | 5 sec. | 30 sec. | 60 sec. |
| 0 | 0 | 18 | 28 | 43 |
| | 50 | 13 | 28 | 43 |
| 12½ | 0 | 246 | 334 | 398 |
| | 50 | 263 | 298 | 328 |
| 25 | 0 | 299 | 400 | 458 |
| | 50 | 288 | 310 | 305 |
| 100 | 0 | 390 | +500 | |
| | 50 | 358 | +500 | |

From the foregoing results it can be seen that the resin treated blood glue base powders of the invention possess a high degree of aging stability. Had the resin been stored separately for the same length of time, it would have been entirely unsuited for use in glue manufacture, as is evident from the following aging viscosity versus time relationship of a 50% solids phenolic resin at 70–80° F.

| Storage time (days): | Brookfield viscosity (centipoises) |
|---|---|
| 0 | 345 |
| 15 | 590 |
| 24 (unusable) | 100,000 |

Having thus described our invention in preferred embodiments we claim as new and desire to protect by Letters Patent:

1. The process of making a solid, resin-blood glue base which comprises
   (a) providing an aqueous resinous condensation product of an aldehyde of the class consisting of formaldehyde, acetaldehyde and furfural; and a phenol of the class consisting of phenol, cresol, xylenol and resorcinol; the resinous condensation product having an aldehyde to phenol ratio of 0.5:1 to 6:1, a solids content of from 20 to 60% by weight and a pH from 7.1 to 14.0,
   (b) adding from 0.1 to 120% by weight based on the weight of the blood, of the liquid resinous condensation product (resin solids basis) to uncoagulated declotted liquid blood (dry solids basis),
   (c) mixing together the aqueous resinous condensation product and the liquid blood, and
   (d) spray drying the resulting mixture to form a solid resin-blood glue base.

2. The process of claim 1 wherein the aqueous resinous condensation product has an aldehyde to phenol ratio of 1:1 to 3:1.

3. The process of claim 1 wherein from 1 to 25% by weight of the aqueous resinous condensation product is added to the liquid blood.

4. The process of claim 1 wherein the aqueous resinous condensation product is an aqueous resinous condensation product of phenol and formaldehyde.

5. The process of claim 1 wherein the aqueous resinous condensation product is an aqueous resinous condensation product of acetaldehyde, and a phenol.

6. The process of claim 1 wherein the aqueous resinous condensation product is an aqueous resinous condensation product of furfural and a phenol.

7. The process of claim 1 wherein the aqueous resinous condensation product is an aqueous resinous condensation product of formaldehyde and resorcinol.

8. The resin-blood glue base product of the process of claim 1.

References Cited

UNITED STATES PATENTS

| 2,066,857 | 1/1937 | Rozema et al. | 260—7 |
| 2,368,466 | 1/1945 | Golick et al. | 260—7X |
| 2,389,183 | 11/1945 | Cone | 260—7X |
| 2,405,658 | 8/1946 | Kremer | 260—7X |
| 2,874,134 | 2/1959 | Gossett et al. | 260—6 |
| 3,095,571 | 6/1963 | Cone | 260—7 |
| 3,450,651 | 6/1969 | Carstensen | 260—7 |
| 2,105,269 | 1/1938 | Robinson | 260—7 |

WILLIAM H. SHORT, Primary Examiner

H. SCHAIN, Assistant Examiner

UNITED STATES PATENT OFFICE
CERTIFICATE OF CORRECTION

Patent No. 3,547,844                  Dated Dec. 15, 1970

Inventor(s) Dale J. Hohbach et al.

It is certified that error appears in the above-identified patent and that said Letters Patent are hereby corrected as shown below:

Column 3, Tables 1, 2 and 3, under the heading "Viscosit (Poises), "sec.", each occurrence, should read -- minutes -

Signed and sealed this 11th day of April 1972.

(SEAL)
Attest:

EDWARD M.FLETCHER,JR.                  ROBERT GOTTSCHALK
Attesting Officer                       Commissioner of Patent